United States Patent Office 3,478,715
Patented Nov. 18, 1969

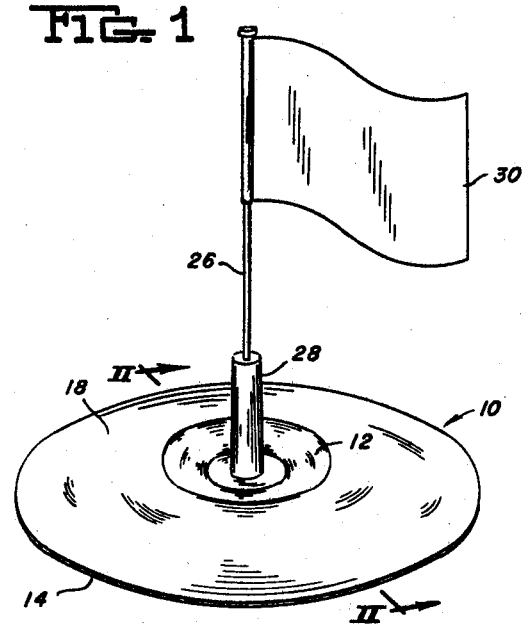
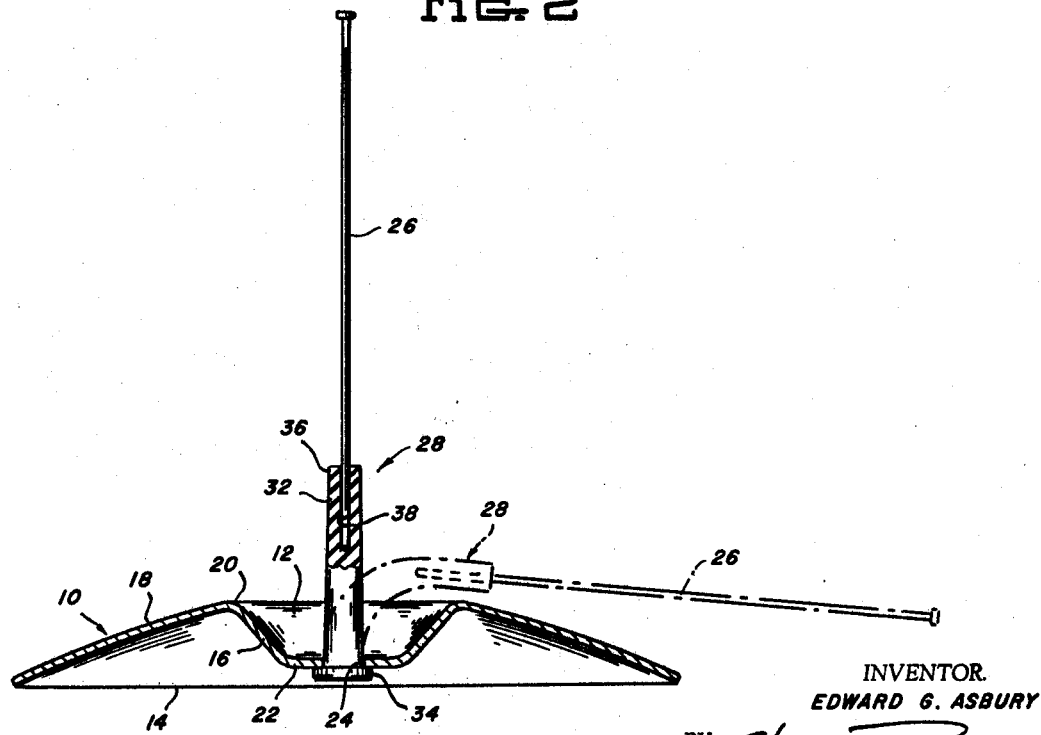

3,478,715
PORTABLE ROADWAY SIGNAL DEVICE
Edward G. Asbury, Pittsburgh, Pa., assignor to Signal-Lite Road Marker Co., Murraysville, Pa., a corporation of Pennsylvania
Filed Feb. 25, 1969, Ser. No. 802,176
Int. Cl. E01f 9/10
U.S. Cl. 116—63          5 Claims

ABSTRACT OF THE DISCLOSURE

The portable roadway signal device includes a semi-spherical base member with a planar central recessed portion. A rubber staff support member extends upwardly through an aperture in the base member recessed portion and has an enlarged bottom portion abutting the underside of the base member. A rigid flag carrying staff member is secured in the upper end of the staff support member. The rubber staff support member upon lateral deflection of said staff member flexes from a location adjacent the upper planar surface of the base member central recessed portion.

BACKGROUND OF THE INVENTION

Field of the invention

This invention relates to a portable roadway signal device and more particularly to a portable roadway signal device having a flexible staff support extending upwardly through an aperture in the base member.

Description of the prior art

United States Patent 3,016,035 discloses a portable roadway signal device in which the staff member is flexibly connected to a base member by means of a coil spring. The coil spring has one end positioned in an upwardly extending cylindrical receiver that forms a part of the base member and a pin member expands the end portion of the spring member positioned within the receiver to frictionally engage the spring to the support member. A rigid staff extends into the coil spring and is secured therein.

Although the signal device disclosed in the above enumerated patent resiliently connects the staff member to the base member so that the staff member is deflected when a vehicle tire passes over the base member, the coil spring in certain instances, where the force of the vehicle tire exceeds the resilience of a spring coil transversely to the longitudinal axis of the coil spring, is bent so that the staff no longer remains vertical. Further, the fabrication and assembly of the portable signal device disclosed in United States Patent 3,016,035 is expensive and time consuming. The coil spring is expensive and the assembly of the signal device that include inserting the pin member to frictionally engage the spring to the upstanding receiving member is time consuming. There is a need, therefore, for a portable roadway signal device in which the staff support member is not permanently deformed or bent by vehicle tires passing thereover. There is a further need for a roadway signal device that is more economical to manufacture and assemble.

SUMMARY OF THE INVENTION

The hereinafter described invention is an improvement on the portable roadway signal device disclosed in United States Patent 3,016,035. The base member has a central circular recessed portion with a planar central portion. A flexible resilient rubber staff support member extends upwardly through an aperture in the circular recessed portion and has an enlarged end portion abutting the underside of the base member to thereby frictionally engage the staff support member to the base member. A rigid staff is positioned in and frictionally engaged in a longitudinal passageway of the flexible resilient staff support member. The resilient staff support member is formed from a rubber compound and is not permanently deformed by transverse forces of vehicle tires being exerted thereon as the vehicle tires pass over the base member.

Accordingly, the principal object of this invention is to provide a portable roadway signal device having a flexibly connected staff member that does not permanently deform when subjected to substantial transverse forces.

Another object of this invention is to provide a portable roadway signal device that is economical to manufacture and requires a minimum amount of time to assemble.

BRIEF DESCRIPTION OF THE DRAWINGS

In the drawings:

FIGURE 1 is a perspective view of my improved portable roadway signal device.

FIGURE 2 is a view in section taken along the line 2—2 in FIGURE 1 with a portion of the flexible staff support member broken away and the flexible staff support member and rigid staff member illustrated in phantom in a deflected position.

DESCRIPTION OF THE PREFERRED EMBODIMENT

Referring to the drawings, the numeral 10 generally designates a base member that is semi-spherical in shape and has a central recessed portion 12 and an annular road contacting surface 14. The central recessed portion 12 has an outwardly flared annular side wall 16 that smoothly merges with the base member upper surface 18 and forms a smooth annular lip portion 20 therebetween. The recessed portion 12 has a central planar portion 22 with a central aperture 24 therethrough.

A rigid staff member 26 is connected to the base member 10 by means of a flexible resilient staff support member generally designated by the numeral 28. A flag 30 or other warning divice is suitably secured to the upper portion of the rigid staff member 26.

The flexible resilient staff support member 28 has a body portion 32 with an enlarged bottom end portion 34 and an upper end portion 36. The body portion 32 has a cylindrical outer surface 28 that increases slightly in circumference between the upper edge 36 and the enlarged bottom portion 34 as is illustrated in FIGURE 2. The enlarged bottom portion 34 is cylindrical in shape and has a dimension substantially larger than the aperture 24 in the support member 10. The diameter of the body portion 32 adjacent the upper edge portion 36 is less than the diameter of the aperture 24. The diameter of the body portion adjacent the enlarged bottom portion 34 is slightly larger than the diameter of aperture 24 so that the staff support member 28 is frictionally engaged in the base member 10 when it is positioned in the base member aperture 24 with the enlarged bottom portion abutting the underside of the base member planar central recessed portion 22.

The flexible resilient staff support member body portion 32 has a longitudinal axial passageway 38 extending downwardly from the upper edge portion 36 and terminating at a location above the lip portion 20 of supporting member 10.

The flexible resilient staff support member 28 is molded from a natural or synthetic rubber material or a combination of natural and synthetic rubbers. The flexible staff support member may also be fabricated from organic polymeric materials that exhibit the properties of natural or synthetic rubber in that they are resilient and not permanently deformed when subjected to substantial compressive forces.

The portable roadway signal device is quickly assembled by inserting the flexible support member 28 through the aperture 24 in the base member 10 until the enlarged bottom portion 34 abuts the underside of the base support member 10 and the support member body portion 32 is frictionally engaged to the side wall of the aperture 24. The end portion of the rigid staff member 26 is then positioned in the passageway 38 and the portable roadway signal device is assembled.

As illustrated in FIGURE 2, the flexible staff support member 28 upon deflection by a vehicle tire bends from a location adjacent the planar base portion 22 of the central recessed portion 12 to thereby provide greater flexibility for the staff support member 28 so that the signal device may be subjected to a substantial number of deflections of the support member 28 without damage thereto.

According to the provisions of the patent statutes, I have explained the principle, preferred construction and mode of operation of my invention and have illustrated and described what I now consider to represent its best embodiment.

I claim:
1. A portable roadway signal device having,
   a base member with a semi-spherical upper surface, a planar road contacting surface, a central circular recessed portion and a central staff support receiving aperture,
   said central circular recessed portion having an outwardly flanged annular side wall with an outer curved annular lip portion merging with said bass member semispherical upper surface,
   a rigid staff member having an upper flag receiving portion and a lower end portion,
   the improvement comprising,
   a flexible resilient rubber staff support member having a body portion with an outer surface of substantially the same configuration as said staff support receiving aperture, a top end wall and an enlarged bottom portion having a transverse dimension larger than the dimension of said staff support receiving aperture,
   said body portion adjacent said enlarged base portion having a dimension larger than said staff support receiving aperture,
   said body portion having a vertical passageway opening into said top end wall, said passageway having a transverse dimension smaller than the transverse dimension of said staff member lower end portion,
   said flexible resilient support body portion extending upwardly therethrough and frictionally engaged in said staff support receiving aperture with said enlarged base portion abutting the underside of said base member centrally recessed portion,
   said staff member lower end portion positioned in said body portion vertical passageway with said staff member extending upwardly from said flexible resilient staff support member.

2. A portable roadway signal device as set forth in claim 1 in which,
   said central circular recessed portion has a planar central portion with said central staff receiving aperture therein, said flexible resilient rubber staff support member, upon lateral deflection of said staff member, flexes from a location adjacent said planar circular portion of said central recessed portion.

3. A portable roadway signal device as set forth in claim 1 in which,
   the longitudinal dimension of said flexible resilient staff support member is greater than the depth of said base member central recessed portion so that said resilient staff support member upon lateral deflection extends over said base member annular lip portion.

4. A portable roadway signal device as set forth in claim 1 in which,
   said flexible resilient rubber staff support member has a substantially cylindrical body portion.

5. A portable roadway signal device as set forth in claim 4 in which,
   said flexible resilient rubber staff support member enlarged bottom portion has a cylindrical shape.

References Cited

UNITED STATES PATENTS

| | | | |
|---|---|---|---|
| 1,726,817 | 9/1929 | Franklin. | |
| 2,887,983 | 5/1959 | Budd | 116—63 |
| 3,016,035 | 1/1962 | Asbury | 116—63 |
| 3,380,428 | 4/1968 | Abrams | 116—63 |

LOUIS J. CAPOZI, Primary Examiner

U.S. Cl. X.R.

40—125; 94—1.5